US009275067B2

(12) United States Patent
Bates et al.

(10) Patent No.: US 9,275,067 B2
(45) Date of Patent: **\*Mar. 1, 2016**

(54) APPARATUS AND METHOD TO SEQUENTIALLY DEDUPLICATE DATA

(75) Inventors: Allen Keith Bates, Tucson, AZ (US); Nils Haustein, Soergenloch (DE); Gail Hepworth, Milton, NY (US); Craig Anthony Klein, Tucson, AZ (US); Ulf Troppens, Mains (DE); Daniel James Winarski, Tucson, AZ (US)

(73) Assignee: International Busines Machines Corporation, Armonk, NY (US)

( * ) Notice: Subject to any disclaimer, the term of this patent is extended or adjusted under 35 U.S.C. 154(b) by 1260 days.

This patent is subject to a terminal disclaimer.

(21) Appl. No.: 12/404,998

(22) Filed: Mar. 16, 2009

(65) Prior Publication Data

US 2010/0235333 A1  Sep. 16, 2010

(51) Int. Cl.
*G06F 7/00* (2006.01)
*G06F 17/30* (2006.01)

(52) U.S. Cl.
CPC ...... *G06F 17/30156* (2013.01); *G06F 17/3015* (2013.01); *G06F 17/30303* (2013.01)

(58) Field of Classification Search
None
See application file for complete search history.

(56) References Cited

U.S. PATENT DOCUMENTS

| | | | |
|---|---|---|---|
| 2006/0041562 A1 | 2/2006 | Paczkowski et al. | |
| 2007/0079086 A1 | 4/2007 | Wang et al. | |
| 2007/0192374 A1 | 8/2007 | Abnous et al. | |
| 2007/0266144 A1 | 11/2007 | Bollen et al. | |
| 2007/0288525 A1 | 12/2007 | Stakutis et al. | |
| 2008/0022133 A1 | 1/2008 | Sobel et al. | |
| 2009/0192978 A1* | 7/2009 | Hewett et al. | 707/1 |
| 2009/0276454 A1* | 11/2009 | Smith | 707/102 |

OTHER PUBLICATIONS

Mandagere et al., "Demystifying Data Deduplication", Middleware '08 Companion, pp. 12-17, Dec. 2008, ACM.*

* cited by examiner

*Primary Examiner* — Michael Hicks
(74) *Attorney, Agent, or Firm* — Dale F. Regelman; Quarles & Brady LLP

(57) ABSTRACT

A method to sequentially deduplicate data, wherein the method receives a plurality of computer files, wherein each of the plurality of computer files comprises a label comprising a file name, a file type, a version number, and file size, and stores that plurality of computer files in a deduplication queue. The method then identifies a subset of the plurality of computer files, wherein each file of the subset comprises the same file name but a different version number, and wherein the subset comprises a maximum count of version numbers, and wherein the subset comprises a portion of the plurality of computer files. The method deduplicates the subset using a hash algorithm, and removes the subset from said deduplication queue.

20 Claims, 6 Drawing Sheets

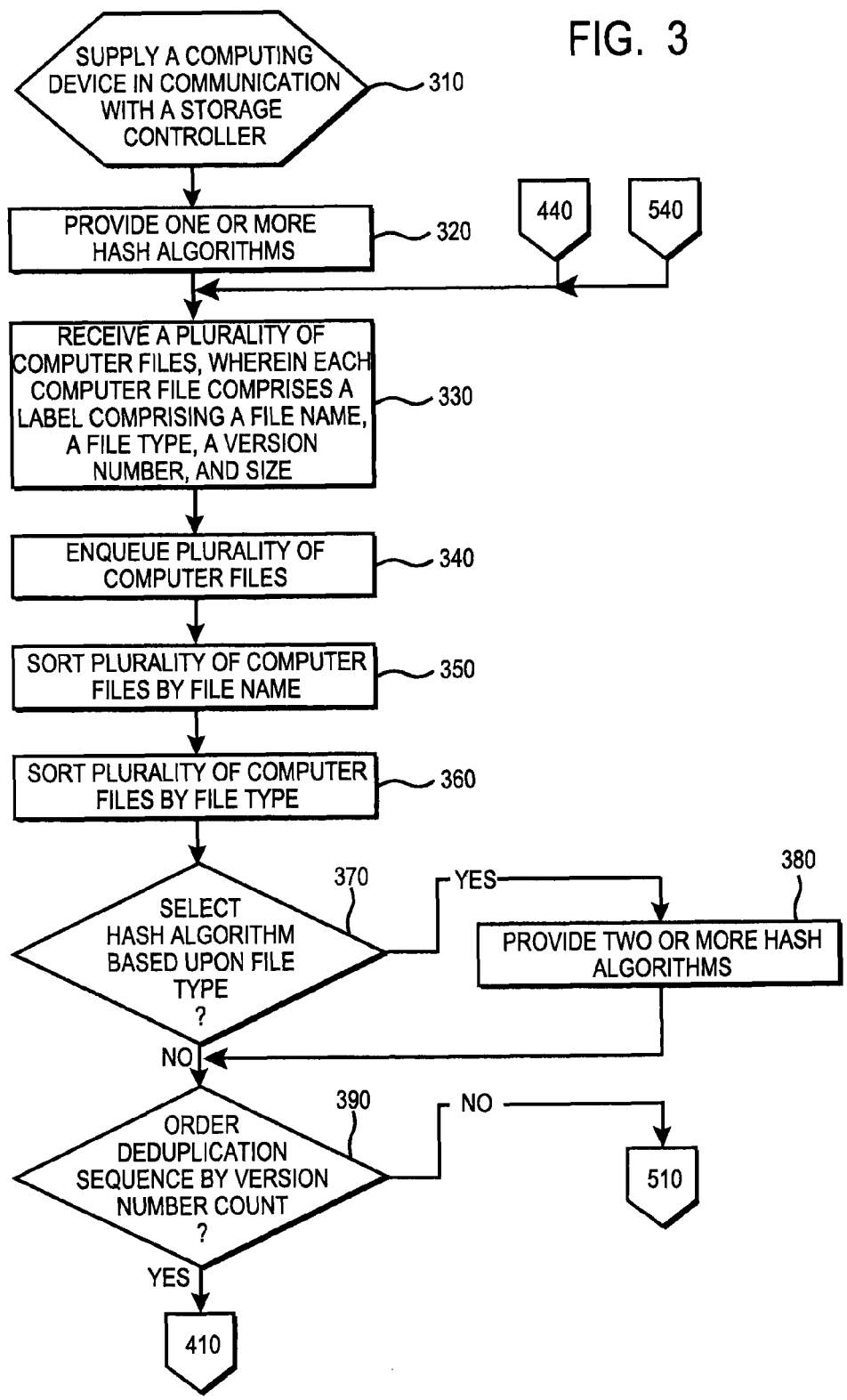

APPARATUS AND METHOD TO SEQUENTIALLY DEDUPLICATE DATA

FIELD OF THE INVENTION

This invention relates to an apparatus and method to sequentially deduplicate computer files.

BACKGROUND OF THE INVENTION

Computing systems generate information. It is known in the art to store such information using a plurality of data storage media. It is resource inefficient, however, to store redundant data.

Data deduplication, sometimes referred to as "intelligent compression" or "single-instance storage," is a method of reducing storage needs by eliminating redundant data. Only one unique instance of the data is actually retained on storage media, such as disk or tape. Redundant data is replaced with a pointer to the unique data copy. For example, a typical email system might contain 100 instances of the same one megabyte (MB) file attachment. If the email platform is backed up or archived, all 100 instances are saved, requiring 100 MB storage space. With data deduplication, only one instance of the attachment is actually stored; each subsequent instance is just referenced back to the one saved copy. In this example, a 100 MB storage demand could be reduced to only one MB.

Data deduplication offers other benefits. Lower storage space requirements will save money on disk expenditures. The more efficient use of disk space also allows for longer disk retention periods, which provides better recovery time objectives (RTO) for a longer time and reduces the need for tape backups. Data deduplication also reduces the data that must be sent across a WAN for remote backups, replication, and disaster recovery.

SUMMARY OF THE INVENTION

The invention comprises a method to sequentially deduplicate data. The method receives a plurality of computer files, wherein each of the plurality of computer files comprises a label comprising a file name, a file type, a version number, and size, and stores that plurality of computer files in a deduplication queue.

The method then creates a subset of the plurality of computer files, wherein each file of the subset comprises the same file name but a different version number, and wherein the subset comprises a maximum count of version numbers, and wherein the subset comprises a portion of the plurality of computer files. The method deduplicates the subset using a hash algorithm, and removes the subset from said deduplication queue.

BRIEF DESCRIPTION OF THE DRAWINGS

The invention will be better understood from a reading of the following detailed description taken in conjunction with the drawings in which like reference designators are used to designate like elements, and in which:

FIG. 3 is a flow chart summarizing the initial steps of Applicants' method;

DETAILED DESCRIPTION OF THE PREFERRED EMBODIMENTS

This invention is described in preferred embodiments in the following description with reference to the Figures, in which like numbers represent the same or similar elements. Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

The described features, structures, or characteristics of the invention may be combined in any suitable manner in one or more embodiments. In the following description, numerous specific details are recited to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Figure 1:
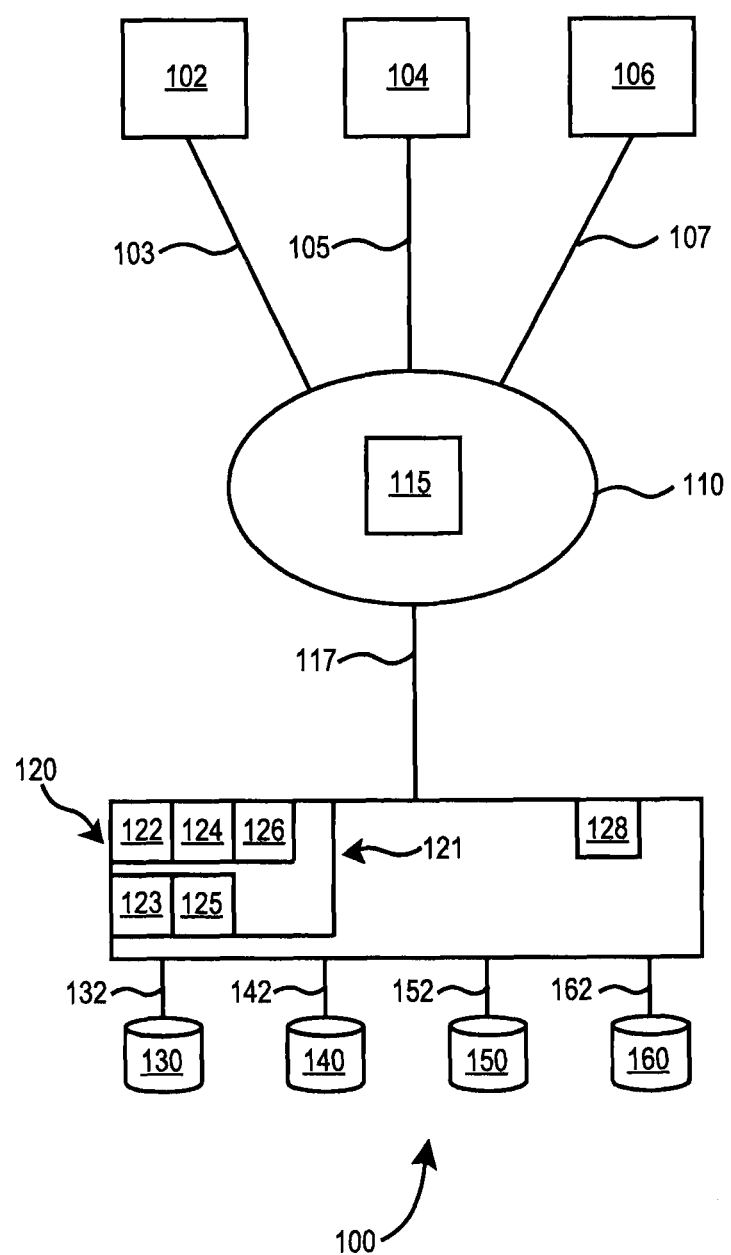
FIG. 1 is a block diagram showing one embodiment of Applicants' data storage system.

In the illustrated embodiment of FIG. 1, data processing system 100 comprises storage controller 120 and data storage media 130, 140, 150, and 160. In the illustrated embodiment of FIG. 1, storage controller 120 communicates with data storage media 130, 140, 150, and 160, via I/O protocols 132, 142, 152, and 162, respectively. I/O protocols 132, 142, 152, and 162, may comprise any sort of I/O protocol, including without limitation a fibre channel loop, SCSI (Small Computer System Interface), iSCSI (Internet SCSI), SAS (Serial Attach SCSI), Fibre Channel, SCSI over Fibre Channel, Ethernet, Fibre Channel over Ethernet, Infiniband, and SATA (Serial ATA).

By "data storage media," Applicants mean an information storage medium in combination with the hardware, firmware, and/or software, needed to write information to, and read information from, that information storage medium. In certain embodiments, the information storage medium comprises a magnetic information storage medium, such as and without limitation a magnetic disk, magnetic tape, and the like. In certain embodiments, the information storage medium comprises an optical information storage medium, such as and without limitation a CD, DVD (Digital Versatile Disk), HD-DVD (High Definition DVD), BD (Blue-Ray Disk) and the like. In certain embodiments, the information storage medium comprises an electronic information storage medium, such as and without limitation a PROM, EPROM, EEPROM, Flash PROM, compactflash, smartmedia, and the like. In certain embodiments, the information storage medium comprises a holographic information storage medium.

Further in the illustrated embodiment of FIG. 1, Applicants' storage controller 120 is in communication with host computers 102, 104, and 106. As a general matter, hosts computers 102, 104, and 106, each comprises a computing system, such as a mainframe, personal computer, workstation, and combinations thereof, including an operating system such as Windows, AIX, Unix, MVS, LINUX, etc. (Windows is a registered trademark of Microsoft Corporation; AIX is a registered trademark and MVS is a trademark of IBM Corporation; UNIX is a registered trademark in the United States and other countries licensed exclusively through The Open Group; and LINUX is a registered trademark of Linus Torvald). In certain embodiments, one or more of host computers 102, 104, and/or 106, further includes a storage management program. In certain embodiments, that storage management program may include the functionality of storage management type programs known in the art that manage the transfer of data to and from a data storage and retrieval system, such as for example and without limitation the IBM DFSMS implemented in the IBM MVS operating system.

In the illustrated embodiment of FIG. 1, Applicants' storage controller 120 comprises processor 128 and computer readable medium 121, microcode 122 written to computer readable medium 121, instructions 124 written to computer readable medium 121, a first stage hash algorithm 123 written to computer readable medium 121, and a second stage hash algorithm 125 written to computer readable medium 121. Processor 128 utilizes microcode 122 to operate storage controller 120. In the illustrated embodiment of FIG. 1, Applicants' storage controller 120 further comprises deduplication queue 126. Processor 128 performs certain operations related to data received from one or more host computers, such as for example and without limitation data deduplication.

In the illustrated embodiment of FIG. 1, host computers 102, 104, and 106, are connected to fabric 110 utilizing I/O protocols 103, 105, and 107, respectively. I/O protocols 103, 105, and 107, may be any type of I/O protocol; for example, a Fibre Channel ("FC") loop, a direct attachment to fabric 110 or one or more signal lines used by host computers 102, 104, and 106, to transfer information to and from fabric 110.

In certain embodiments, fabric 110 includes, for example, one or more switches 115. In certain embodiments, those one or more switches 115 comprise one or more conventional router switches. In the illustrated embodiment of FIG. 1, one or more switches 115 interconnect host computers 102, 104, and 106, to storage controller 120 via I/O protocol 117. I/O protocol 117 may comprise any type of I/O interface, for example, a Fibre Channel, Infiniband, Gigabit Ethernet, Ethernet, TCP/IP, iSCSI, SCSI I/O interface or one or more signal lines used by FC switch 115 to transfer information through to and from storage controller 120, and subsequently data storage media 130, 140, 150, and 160. In other embodiments, one or more host computers, such as for example and without limitation host computers 102, 104, and 106, communicate directly with storage controller 120 using I/O protocols 103, 105, and 107, respectively.

Figure 2A:
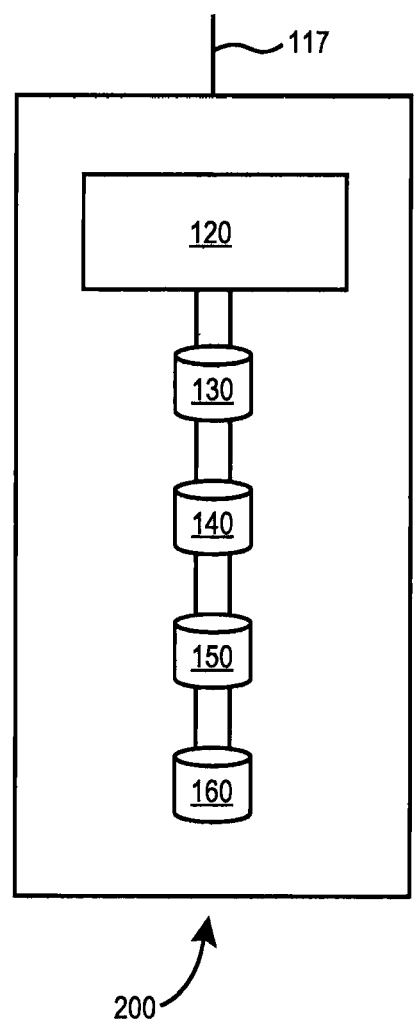
FIG. 2A is a block diagram showing one storage controller in communication with a plurality of data storage media using a fibre channel arbitrated loop.

In the illustrated embodiment of FIG. 2A, Applicants' storage controller 120 communicates with data storage media 130, 140, 150, and 160, using a fibre channel arbitrated ("FC-AL") loop of switches, wherein controller 120 and media 130, 140, 150, and 160, are disposed in information storage and retrieval system 200. As those skilled in the art will appreciate, information storage and retrieval system 200 further comprises additional elements, such as and without limitation one or more host adapters, one or more device adapters, a data cache, non-volatile storage, and the like. The illustrated embodiment of FIG. 2A should not be construed to limit Applicants' invention to use of fibre channel networks or devices. In other embodiments, other network topologies and devices are utilized, including without limitation SAS devices and/or SATA devices.

Figure 2B:
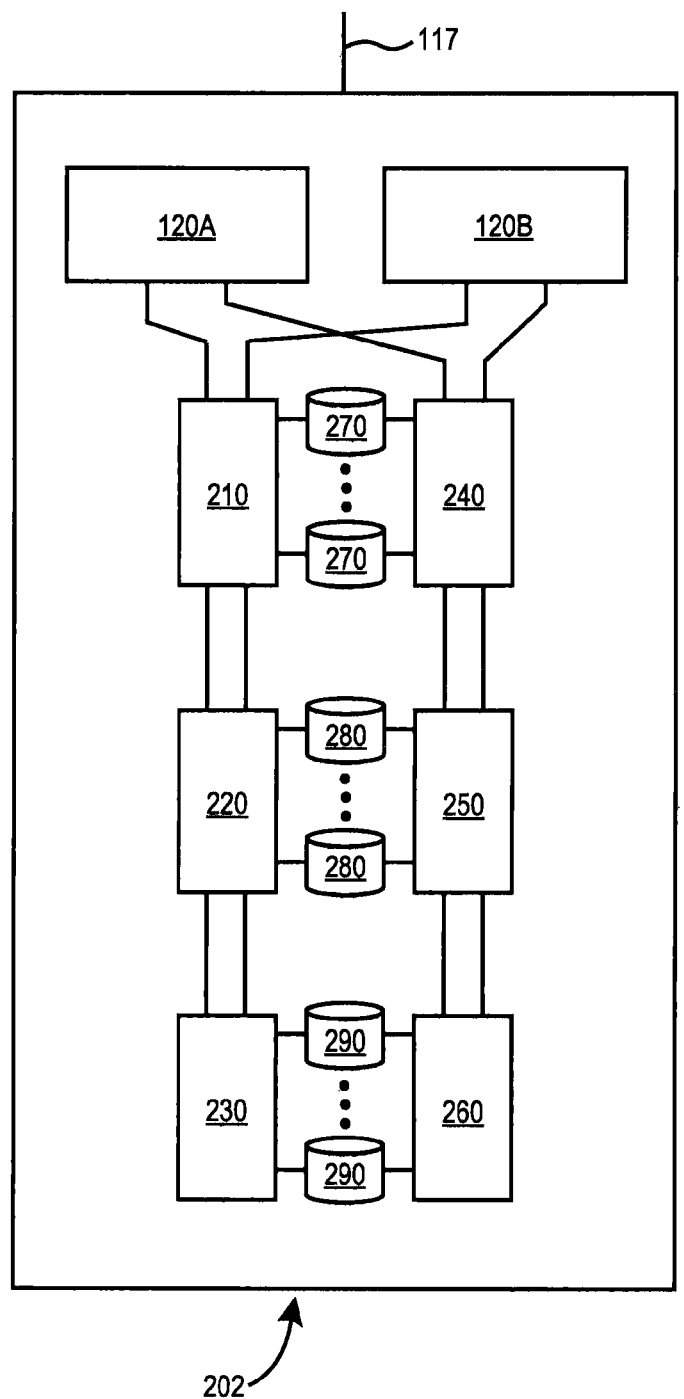
FIG. 2B is a block diagram showing two storage controllers in communication with a plurality of data storage media using dual fibre channel arbitrated loops.

In the illustrated embodiment of FIG. 2B, Applicants' information storage and retrieval system 202 comprises dual FC-AL loops of switches wherein storage controller 120A and storage controller 120B are interconnected with both FC-AL loops. Each FC-AL loop contains one or more local controllers, such as local controllers 210, 220, 230, 240, 250, and 260. As those skilled in the art will appreciate, information storage and retrieval system 200 further comprises additional elements, such as and without limitation one or more host adapters, one or more device adapters, a data cache, non-volatile storage, and the like. In the illustrated embodiment of FIG. 2B, each storage controller is in communication with a first plurality of data storage media 270, a second plurality of data storage media 280, and a third plurality of data storage media 290.

The illustrated embodiment of FIG. 2B should not be construed to limit Applicants' invention to use of fibre channel networks or devices. In the illustrated embodiment of FIG. 2B, the recitation of two FC-AL loops comprises one embodiment of Applicants' apparatus. In other embodiments, other network topologies and devices are utilized, including without limitation SAS devices and/or SATA devices.

As those skilled in the art will appreciate, data deduplication comprises a process to eliminate redundant data. In the deduplication process, duplicate data is deleted, leaving only one copy of the data to be stored. In certain embodiments, indexing of all data is still retained should that data ever be required. Deduplication is able to enhance the storage capability of a storage array because only unique data is stored.

Data deduplication can generally operate at the file or the data block level. File level deduplication eliminates duplicate files, but this is not always a very efficient means of deduplication, especially if the plurality of files do not contain identical data. With block level deduplication files or more general data streams are chunked into blocks of fixed or variable size. The deduplication process calculates an identity characteristic for each file or block and compares this against the identity characteristic of files or blocks which have been processed prior. If the identity characteristic matches the processed file or block might be referenced to the already stored instance. Applicants method however uses a second identity characteristic to assure identity. A typical method for calculating identity characteristics is hash algorithm, such as the hash algorithms recited in Table 1. Such a hash algorithm generates a Digest L, sometimes referred to as a "stub."

TABLE 1

| Name | Output bits of Digest L | Cycles/byte | Normalized Cycles/byte | Probability of a Collision is 50% for $2^{L/2}$ chunks | Chance of one collision in 40 Petabytes using 4 KB/chunk |
|---|---|---|---|---|---|
| MD5 | 128 | 3.66 | 1:1 | $2^{64} \sim 10^{20}$ | $0.5 * 10^{-20}$ |
| SHA-1 | 160 | 8.30 | 2.27:1 | $2^{80} \sim 10^{24}$ | $0.5 * 10^{-28}$ |
| SHA-256 | 256 | 20.59 | 5.63:1 | $2^{128} \sim 10^{40}$ | $0.5 * 10^{-60}$ |
| SHA-512 | 512 | 40.18 | 10.98:1 | $2^{256} \sim 10^{80}$ | $0.5 * 10^{-140}$ |
| Whirlpool | 512 | 36.52 | 9.98:1 | $2^{256} \sim 10^{80}$ | $0.5 * 10^{-140}$ |

Table 1 recites five (5) hash algorithms. Applicants' method utilizes one or more of these hash algorithms to identify candidate files for deduplication. The descriptor "MDA5" is an acronym for Message-Digest Algorithm. "SHA" is an acronym for Secure HASH Algorithm.

Table 1 recites a length for a digest L produced by each algorithm, wherein that digest L comprises a fixed number of bits of output. Table 1 further recites, for each algorithm, a number of cycles per byte of data hashed. Table 1 further recites, for each algorithm, a normalized cycles per byte. The greater the number of cycles per byte, the slower the algorithm; however, as the length of the digest L increases, the greater is the efficiency of the hash algorithm to avoid collisions. By "collision," Applicants mean creating an identical digest L for dissimilar data chunks.

If a file is updated, only the changed data is saved. That is, if only a few bytes of a document or presentation are changed, only the changed blocks or bytes must be saved, because the rest of the file has been saved already. With file level deduplication a changed file will be stored once again in its entireness. With block level deduplication only the changed blocks are saved and not the entire file. Therefore, block deduplication saves more storage space than file deduplication. However, block deduplication requires more processor resources.

Applicants' method creates a deduplication sequence whereunder the computer files most likely to contain duplicate data are first examined. In certain embodiments, files comprising the same file name but different version numbers are initially selected for deduplication examination. In other embodiments, files comprising a maximum file size are initially selected for deduplication examination.

Referring now to FIG. 3, in step 310 the method supplies a computing device, such as one or more of host computers 102 (FIG. 1), 104 (FIG. 1), and/or 106 (FIG. 1), in communication with a storage controller, such as storage controller 120 (FIGS. 1, 2A, 2B).

In step 320, the method provides one or more hash algorithms, such as for example and without limitations the hash algorithms recited in Table 1. In certain embodiments, the one or more hash algorithms of step 320 are encoded in a computer readable medium disposed in the storage controller of Step 310.

In step 330, the method receives a plurality of computer files, wherein each computer file comprises a label comprising a file name, a file type, a file version, and a file size. The label might be provided by the metadata of a file system according to prior art. In certain embodiments, in step 320 one or more host computers in communication with a storage controller generate the plurality of computer files, and provide that plurality of computer files to the storage controller.

In step 340, the method enqueues the plurality of computer files of step 330 in a deduplication queue. In certain embodiments, the deduplication queue is encoded in a computer readable medium disposed in the storage controller of step 310. In certain embodiments, step 340 is performed by a host computer. In certain embodiments, step 340 is performed by a storage controller.

In step 350, the method sorts the plurality of computer files of step 330 by file name. In certain embodiments, step 350 is performed by a host computer. In certain embodiments, step 350 is performed by a storage controller.

In step 360, the method sorts the plurality of computer files of step 340 by file type. In certain embodiments, step 360 is performed by a host computer. In certain embodiments, step 360 is performed by a storage controller. In certain embodiments, the method performs either step 350 or step 360. In certain embodiments, the method performs both steps 350 and 360.

In step 370, the method determines whether to select and utilize a hash algorithm based upon file type. In certain embodiments, step 370 is performed by a host computer. In certain embodiments, step 370 is performed by a storage controller.

If the method elects to select and utilize a hash algorithm based upon file type, then the method transitions from step 370 to step 380 wherein the method provides two or more hash algorithms. The method transitions from step 380 to step 390.

If the method elects in step 370 not to select and utilize a hash algorithm based upon file type, then the method transitions from step 370 to step 390, wherein the method determines whether to sequentially deduplicate the files based upon version number count. In certain embodiments, step 390 is performed by a host computer. In certain embodiments, step 390 is performed by a storage controller.

Figure 4:
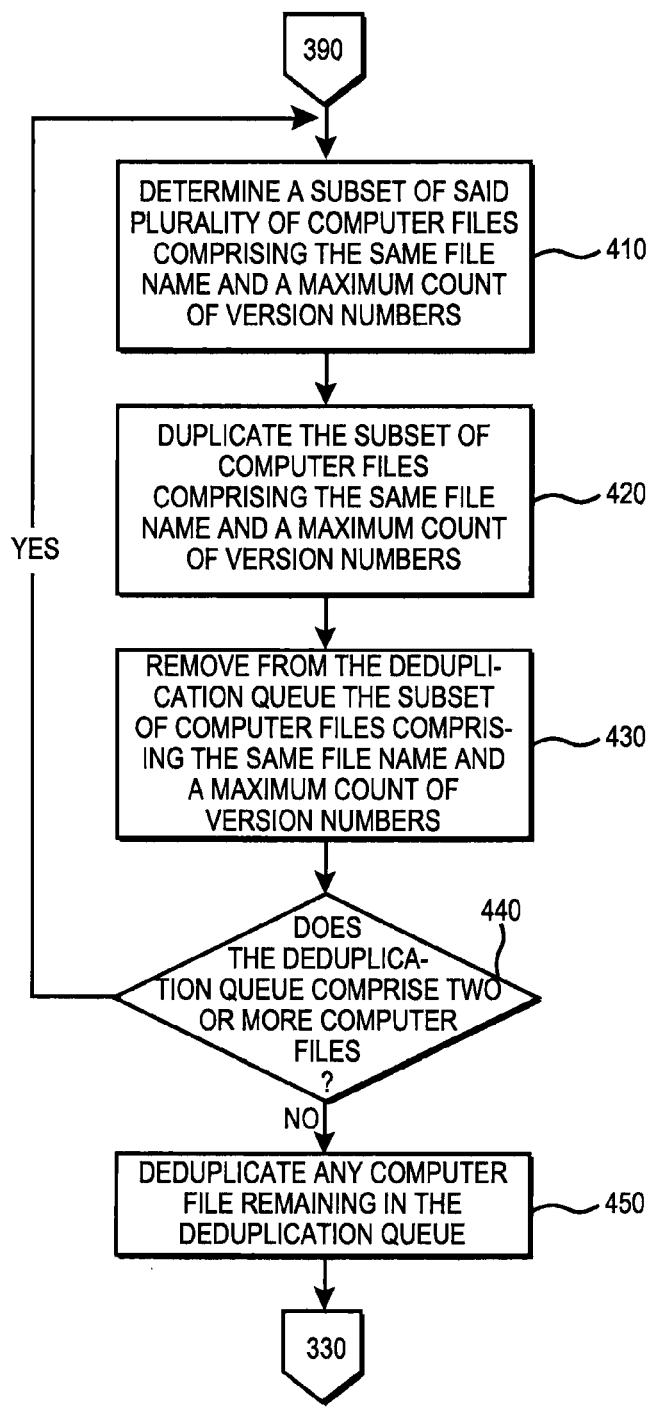
FIG. 4 is a flow chart summarizing certain additional steps of Applicants' method.
Figure 5:
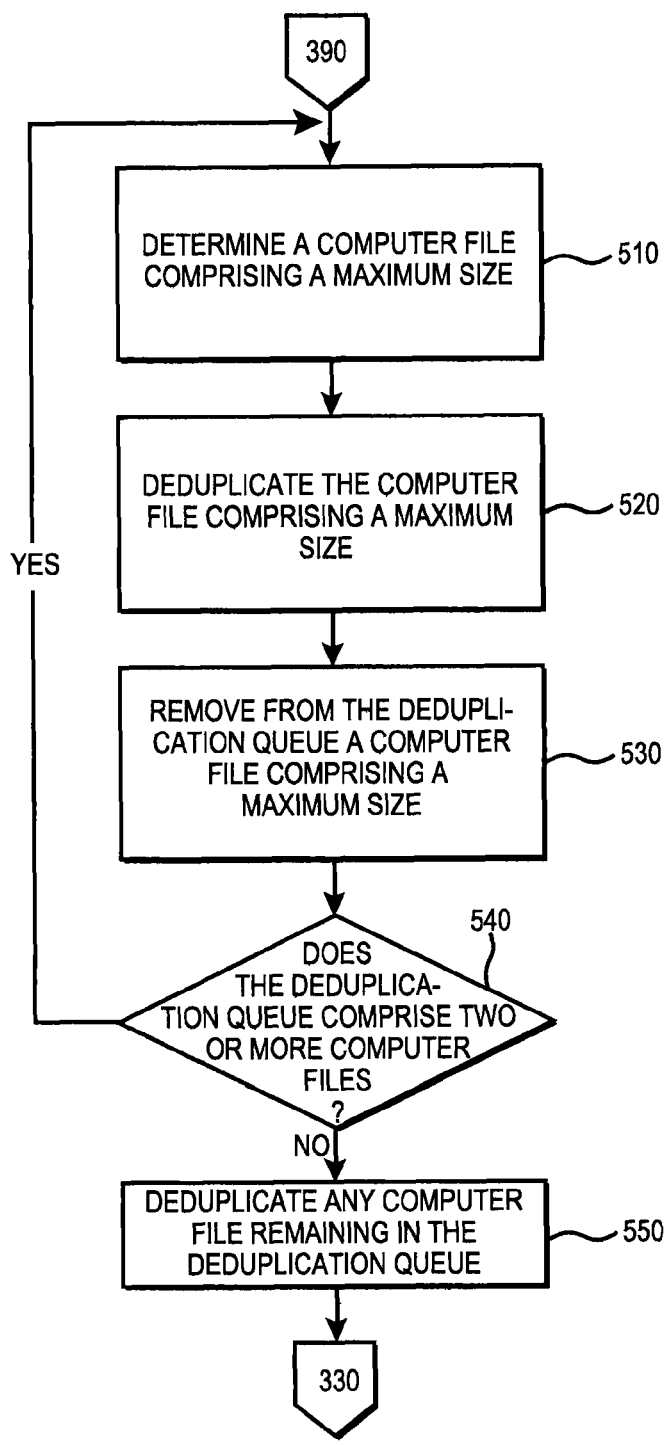
FIG. 5 is a flow chart summarizing certain additional steps of Applicants' method.

If the method elects in step 390 to sequentially deduplicate the files based upon version number count, then the method transitions from step 390 to step 410 (FIG. 4). Alternatively, if the method elects in step 390 not to sequentially deduplicate file based upon version number count, then the method transitions from step 390 to step 510 (FIG. 5).

Referring now to FIG. 4, in step 410 the method identifies a subset of the plurality of computer files of step 330, wherein each computer file in the subset recites the same file name and file type but a different version number, and wherein the subset comprises a maximum version number count. For example, if the plurality of computer files comprises five (5) files comprising a file name test1, wherein each test1 file comprises a different one of five (5) versions, and if the plurality of computer files comprises six (6) files comprising a file name test2, wherein each test2 file comprises a different one of six (6) saved versions, the method in step 410 creates a subset comprising the test2 files, wherein that subset comprises six (6) computer files because the test2 set of files comprises the highest version number count of 6. If the method of FIG. 4 were repeated, the test1 set of files might comprise the highest version number count of 5.

In certain embodiments, step 410 is performed by a host computer. In certain embodiments, step 410 is performed by a storage controller.

In step 420, the method deduplicates the subset of computer files created in step 410. In certain embodiments, step 420 is performed by a host computer. In certain embodiments, step 420 is performed by a storage controller.

In step 430, the method removes from the deduplication queue the subset of computer files created in step 410. In certain embodiments, step 430 is performed by a host computer. In certain embodiments, step 430 is performed by a storage controller.

In step 440, the method determines if the deduplication queue comprises two or more computer files. In certain embodiments, step 440 is performed by a host computer. In certain embodiments, step 440 is performed by a storage controller.

If the method determines in step 440 that the deduplication queue comprises two or more computer files, then the method transitions from step 440 to step 410 and continues as described herein. Alternatively, if the method determines in step 440 that the deduplication queue does not comprise two or more computer files, then the method transitions from step 440 to 450 wherein the method deduplicates any computer file remaining in the deduplication queue. In certain embodiments, step 440 is performed by a host computer. In certain embodiments, step 440 is performed by a storage controller. The method transitions from step 450 to step 330 and pauses until new computer files are received.

Referring now to FIG. 5, in step 510 the method identifies a computer file comprising a largest file size. In certain embodiments, step 510 is performed by a host computer. In certain embodiments, step 510 is performed by a storage controller.

In step 520, the method deduplicates the computer file identified in step 510. In certain embodiments, step 520 is performed by a host computer. In certain embodiments, step 520 is performed by a storage controller.

In step 530, the method removes from the deduplication queue the computer file identified in step 510. In certain embodiments, step 530 is performed by a host computer. In certain embodiments, step 530 is performed by a storage controller.

In step 540, the method determines if the deduplication queue comprises two or more computer files. In certain embodiments, step 540 is performed by a host computer. In certain embodiments, step 540 is performed by a storage controller.

If the method determines in step 540 that the deduplication queue comprises two or more computer files, then the method transitions from step 540 to step 510 and continues as described herein. Alternatively, if the method determines in step 540 that the deduplication queue does not comprise two or more computer files, the method transitions from step 540 to step 550 wherein the method deduplicates any computer file remaining in the deduplication queue. In certain embodiments, step 540 is performed by a host computer. In certain embodiments, step 540 is performed by a storage controller. The method transitions from step 550 to step 330 and pauses until new computer files are received.

In certain embodiments, individual steps recited in FIGS. 3, 4, and/or 5, may be combined, eliminated, or reordered.

In certain embodiments, Applicants' invention includes instructions, such as instructions 124 (FIG. 1), residing in computer readable medium, such as for example computer readable medium 121 (FIG. 1) wherein those instructions are executed by a processor, such as processor 128 (FIG. 1), to perform one or more of steps 330, 340, 350, 360, 370, 380, and/or 390, recited in FIG. 3, and/or one or more of steps 410, 420, 430, and/or 440, recited in FIG. 4, and/or one or more of steps 510, 520, 530, and/or 540, recited in FIG. 5.

In other embodiments, Applicants' invention includes instructions residing in any other computer program product, where those instructions are executed by a computer external to, or internal to, data storage systems 100 (FIG. 1) or 200 (FIG. 2A), or 202 (FIG. 2B), to perform one or more of steps 330, 340, 350, 360, 370, 380, and/or 390, recited in FIG. 3, and/or one or more of steps 410, 420, 430, and/or 440, recited in FIG. 4, and/or one or more of steps 510, 520, 530, and/or 540, recited in FIG. 5. In either case, the instructions may be encoded in computer readable medium comprising, for example, a magnetic information storage medium, an optical information storage medium, an electronic information storage medium, and the like. By "electronic storage media," Applicants mean, for example and without limitation, one or more devices, such as and without limitation, a PROM, EPROM, EEPROM, Flash PROM, compactflash, smartmedia, and the like.

While the preferred embodiments of the present invention have been illustrated in detail, it should be apparent that modifications and adaptations to those embodiments may occur to one skilled in the art without departing from the scope of the present invention as set forth in the following claims.

We claim:

1. A method to sequentially deduplicate data, comprising the following steps in the following order:
    (1) storing a plurality of computer files in a deduplication queue, wherein each of said plurality of computer files comprises a label comprising a file name, a file type, a file version number, and file size;
    (2) identifying a subset of said plurality of computer files, wherein each file of the subset comprises the same file name and file type but a different version number;
    (3) deduplicating said subset using a hash algorithm.

2. The method of claim 1, further comprising:
    determining if said data queue comprises two or more computer files;
    operative if said data queue comprises two or more computer files;
    repeating said determining step, said deduplicating step, and said removing step.

3. The method of claim 1, further comprising:
    sorting said plurality of computer files by file name.

4. The method of claim 1, further comprising sorting said plurality of computer files by file type.

5. The method of claim 4, further comprising:
    provide two or more different hash algorithms;
    selecting a hash algorithm based upon file type.

6. The method of claim 1, wherein said identifying step comprises identifying a computer file comprising a maximum file size, further comprising:
    deduplicating said computer file comprising a maximum file size;
    removing said computer file comprising a maximum file size from said deduplication queue.

7. The method of claim 5, further comprising:
    determining if said data queue comprises two or more computer files;
    operative if said data queue comprises two or more computer files;
    repeating said determining step, said deduplicating step, and said removing step.

8. An article of manufacture comprising a microprocessor, a deduplication queue, two or more hash algorithms, and a computer readable medium comprising computer readable program code disposed therein to sequentially deduplicate data, the computer readable program code comprising a series of computer readable program steps to effect the following steps in the following order:
    (1) storing a plurality of computer files in a deduplication queue, wherein each of said plurality of computer files comprises a label comprising a file name, a file type, a file version number, and file size;
    (2) identifying a subset of said plurality of computer files, wherein each file of the subset comprises the same file name and file type but a different version number;
    (3) deduplicating said subset using a hash algorithm.

9. The article of manufacture of claim 8, said computer readable program code further comprising a series of computer readable program steps to effect:
    determining if said data queue comprises two or more computer files;
    operative if said data queue comprises two or more computer files;
    repeating said determining, said deduplicating, and said removing.

10. The article of manufacture of claim 9, said computer readable program code further comprising a series of computer readable program steps to effect sorting said plurality of computer files by file name.

11. The article of manufacture of claim 9, said computer readable program code further comprising a series of computer readable program steps to effect sorting said plurality of computer files by file type.

12. The article of manufacture of claim 11, further comprising two or more different hash algorithms, said computer readable program code further comprising a series of computer readable program steps to effect selecting for each computer file a hash algorithm based upon file type.

13. The article of manufacture of claim 8, wherein said computer readable program code to determine a subset of said plurality of computer files further comprises a series of computer readable program steps to effect identifying a computer file comprising a maximum file size, said computer readable program code further comprising a series of computer readable program steps to effect:
- deduplicating said computer file comprising a maximum file size;
- removing said computer file comprising a maximum file size from said deduplication queue.

14. The article of manufacture of claim 13, said computer readable program code further comprising a series of computer readable program steps to effect:
- determining if said data queue comprises two or more computer files;
- operative if said data queue comprises two or more computer files;
- repeating said determining step, said deduplicating step, and said removing step.

15. A computer program product encoded in a computer readable medium disposed in a storage controller comprising two or more hash algorithms, a microprocessor, said computer program product being useable with said microprocessor to sequentially deduplicate data, comprising computer readable program code which causes said programmable processor to perform the following steps in the following order:
(1) storing a plurality of computer files in a deduplication queue, wherein each of said plurality of computer files comprises a label comprising a file name, a file type, a file version number, and file size;
(2) identifying a subset of said plurality of computer files, wherein each file of the subset comprises the same file name and file type but a different version number;
(3) deduplicating said subset using a hash algorithm.

16. The computer program product of claim 15, further comprising computer readable program code which causes said programmable processor to sort said plurality of computer files by file name.

17. The computer program product of claim 15, further comprising computer readable program code which causes said programmable processor to sort said plurality of computer files by file type.

18. The computer program product of claim 17, further comprising:
- two or more hash algorithms;
- computer readable program code which causes said programmable processor to selecting for each computer file a hash algorithm based upon file type.

19. The computer program product of claim 15, wherein said computer readable program code which causes said programmable processor to determine a subset of said plurality of computer files further comprises computer readable program code which causes said programmable processor to identify a computer file comprising a maximum file size, further comprising:
- computer readable program code which causes said programmable processor to deduplicate said computer file comprising a maximum file size;
- computer readable program code which causes said programmable processor to remove said computer file comprising a maximum file size from said deduplication queue.

20. The article of manufacture of claim 13, further comprising:
- computer readable program code which causes said programmable processor to determining if said data queue comprises two or more computer files;
- computer readable program code which causes said programmable processor to operative if said data queue comprises two or more computer files;
- repeating said determining step, said deduplicating step, and said removing step.

* * * * *